Feb. 23, 1971 M. J. DI TORO 3,566,274
MULTIPATH WAVE-SIGNAL RECEIVING APPARATUS
Filed May 31, 1966
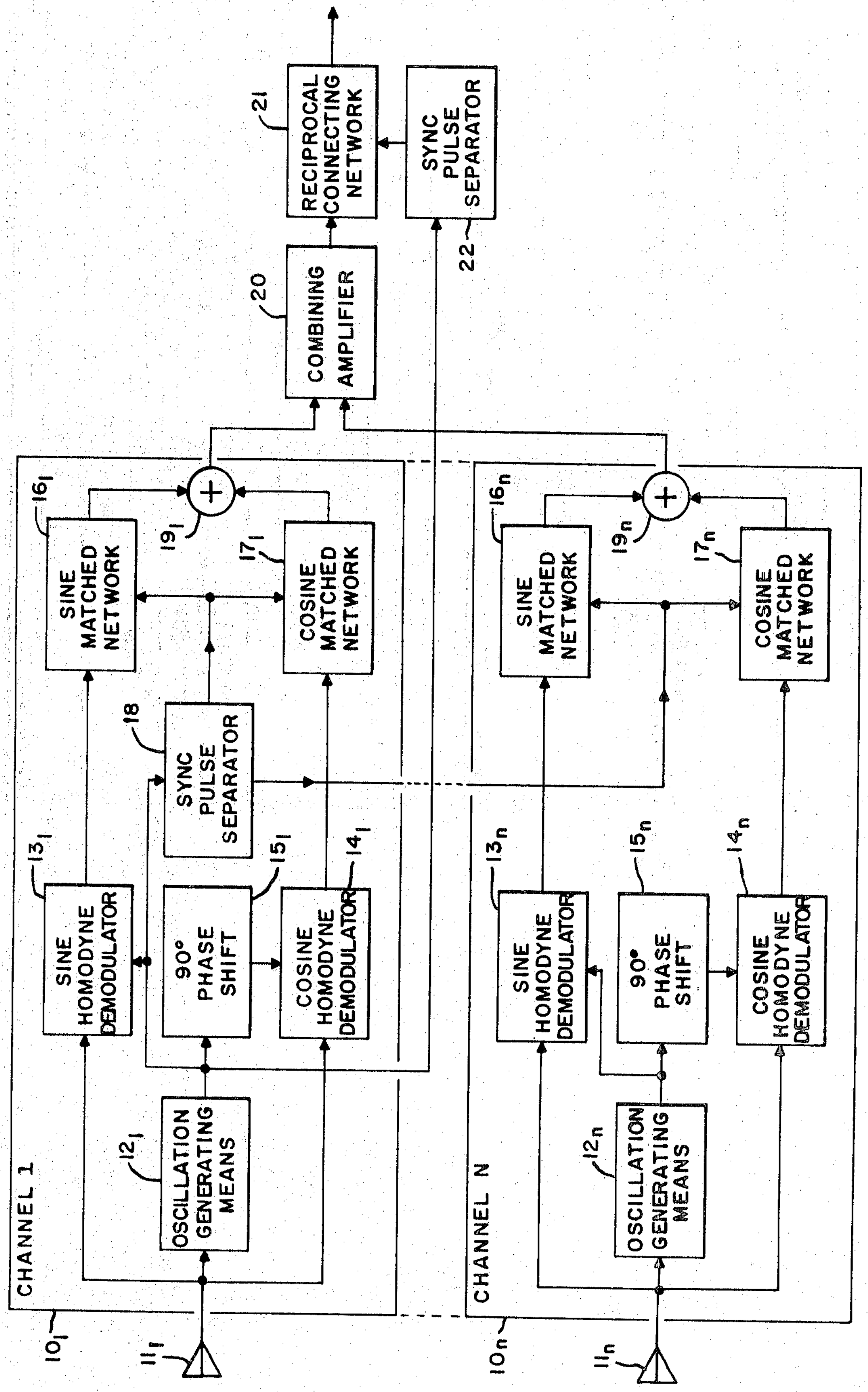

United States Patent Office 3,566,274

Patented Feb. 23, 1971

3,566,274
MULTIPATH WAVE-SIGNAL RECEIVING APPARATUS

Michael J. Di Toro, Massapequa, N.Y., assignor to Cardion Electronics, Inc., a corporation of Delaware Filed May 31, 1966, Ser. No. 553,737

Int. Cl. H04b *1/06*

U.S. Cl. 325—305 5 Claims

ABSTRACT OF THE DISCLOSURE

In a modulated-carrier wave signal-translating system including a transmitter and a receiver interrelated by a multipath radio link having nonlinear phase characteristics, there is provided at the receiver an apparatus for minimizing fading due to multipath effects and for minimizing signal dispersion and distortion due to such phase characteristics which comprises an input circuit for the received multipath signals, an oscillator coupled to the input circuit for generating oscillations having a frequency equal to the average carrier frequency of the received signals, sine and cosine diversity demodulators coupled to the input circuit and to the oscillator with one of the couplings to one of the demodulators including a 90° phase shift, together with a pair of particularly matched correcting networks individually coupled to the demodulators, each correcting network having an impulse response which is the time reverse of the impulse response of the signal translating channel including its associated demodulator and multipath radio link. The outputs of the two correcting networks are coupled to a linear combining stage, whereby there is developed a resultant signal of relatively constant amplitude and relatively free from the effects of multipath dispersion and distortion of the radio link.

This invention relates to multipath wave-signal receiving apparatus and, while it is of general application, it is particularly useful for receiving high-frequency modulated-carrier wave signals through the ionosphere.

In the transmission of high-frequency modulated-carrier wave signals through any time-variable and multipath medium, such as the ionosphere, the received signal arrives via many paths each having different over-all delay, carrier doppler, polarity, and magnitude. Accordingly, linear homodyne detection or demodulation of the received high-frequency multipath signal with a local oscillator generating oscillations of a nominally average fixed carrier frequency causes the resulting demodulated baseband signal to vary from a true replica of the transmitted wave form. In fact, when there is a 90° phase shift between the local oscillator phase and that of any received multipath signal, the time-averaged signal output from that path is zero.

An accepted and useful manner to improve the reliability and the accuracy of transmission in such time-variable medium is to use many uncorrelated channels between the transmitter and the receiver. Examples of such diversity transmission are the use of two antennas separated by many wavelengths at the transmitter and/or the receiver; the use of two channels located at different and uncorrelated parts of the frequency spectrum; and the use of polarization diversity at the transmitter and/or the receiver.

The present invention is based on the principle that any received multipath carrier signal, however modulated, when demodulated by an average-frequency carrier generated at the receiver, comprises both sine and cosine components which are independent and thus can be made effectively to provide a diversity improvement in reception.

In applicant's prior Pat. 3,206,688, there is described an adaptive method for improving transmission in such time-variable media. In this system, prior to high-speed message transmission, a test pulse is first sent which is used at the receiver to determine the baseband impulse response of the medium. As described and claimed in that patent, the correction networks then automatically form a baseband conjugate or matched network, as described and claimed in applicant's prior patent 3,206,687, the impulse response of which is the time-reversed wave form of the impulse response of the medium. This is then followed by a multistage reciprocal network into whose input is fed the output of the matched network. It is the function of the reciprocal network to mitigate the residual undesired side lobes of the input signal to it from the matched network.

In the preferred form of the invention, the principle of sine-cosine diversity, mentioned above, is used in combination with either a matched corrective network as described in aforesaid Pat. 3,206,687 or in combination with such a matched corrective network and a reciprocal corrective network as described and claimed in aforesaid Pat. 3,206,688. As described hereinafter, the use of sine-cosine diversity results in converting all useful signal components to the same polarity, thus considerably simplifying and reducing the cost of the matched corrective network.

In accordance with the invention, there is provided in a modulated-carrier wave-signal translating system including a transmitter and a receiver interrelated by a multipath radio link having nonlinear phase characteristics, an apparatus at the receiver for minimizing fading due to multipath effects nad for minimizing signal dispersion and distortion due to such phase characteristics comprising an input circuit for received multipath signals, means for generating oscillations having a frequency equal to the average carrier frequency of the received signals, first and second demodulator means, circuits individually coupling the input circuit to the oscillation generating means and to the demodulator means, circuits individually coupling the oscillation generating means to the demodulator means, the relative phase characteristics of the two couplings to the demodulators being so proportioned that the two carrier-frequency inputs to one of the demodulators differ in phase by substantially 90° relative to the two carrier-frequency inputs to the other of the demodulators, whereby, upon transmission of a single test pulse through the ionosphere, the output signal of the first demodulator means is represented by the expression $$\sum_{r=1}^{n} (a_r \sin \phi_r) z^{-r}$$

and the output signal of the second demodulator means is represented by the expression $$\sum_{r=1}^{n}(a_r \cos \phi_r)z^{-r}$$

a first matched correcting network coupled to the output of the first demodulator means having an impulse response which is the time reverse of the factor $$\sum_{r=1}^{n}(a_r \sin \phi_r)z^{-r}$$

a second matched correcting network coupled to the output of the second demodulator means having an impulse response which is the time reverse of the factor $$\sum_{r=1}^{n}(a_r \cos \phi_r)z^{-r}$$

and means for linearly combining the outputs of the two correcting networks.

For a better understanding of the present invention, together with other and further objects thereof, reference is had to the following description, taken in connection with the accompanying drawing, while its scope will be pointed out in the appended claims.

Referring now to the drawing:

The single figure is a schematic single-line diagram of a multipath wave-signal receiving apparatus embodying the present invention.

Referring now more particularly to the drawing, there is shown a diversity receiver for use in a modulated-carrier wave-signal translating system including a transmitter which may be conventional and, therefore, is not shown. The receiver is interrelated with the transmitter by a multipath radio link having nonlinear phase characteristics, for example the ionosphere. The receiver includes a plurality of apparatus for minimizing fading due to multipath effects and for minimizing signal dispersion and distortion due to such phase characteristics. This series of apparatus is identified by the units $10_1 \ldots 10_n$ connected to input circuits such as receiving antennas $11_1 \ldots 11_n$. It is assumed that the antennas $11_1 \ldots 11_n$ are designed to receive signals via *n* diversity channels carrying common information. Such diversity may be achieved by physically spacing the antennas $11_1 \ldots 11_n$ or by tuning them to carrier signals of different frequencies, etc. but, in the present example, space diversity is assumed. Since the units $10_1 \ldots 10_n$ are identical, only the unit $10_1$ need be described in detail.

The unit $10_1$ includes means $12_1$ coupled to the input circuit or antenna $11_1$ for generating oscillations having a frequency equal to the average carrier frequency of the signals received over the several multipaths. This means preferably is in the form of a carrier-extraction phase-locked loop such, for example, as shown in FIG. 1 of "A New Look At The Phase-Locked Oscillator" by Harold T. McAleer, Proceedings of the Ire, June, 1959.

The unit $10_1$ further comprises first and second homodyne demodulators $13_1$ and $14_1$ each including couplings to the input circuit $11_1$ and to the oscillation generating means $12_1$. The relative phase characteristics of the two couplings to the demodulators $13_1$ and $14_1$ from input circuit $11_1$ and from generating means $12_1$ are so proportioned that the two carrier-frequency inputs to one of the demodulators differ in phase by substantially 90° relative to the two carrier-frequency inputs to the other of said demodulators. Specifically, as shown, the couplings from the input circuit $11_1$ to the demodulators $13_1$ and $14_1$ are direct, that is, without any phase shift. The coupling from the generating means $12_1$ to the demodulator $13_1$ is also direct while that to the demodulator $14_1$ includes a 90° phase-shift circuit $15_1$ which may be of any conventional configuration. With couplings of this nature $13_1$ may be arbitrarily termed the sine demodulator and unit $14_1$, the cosine demodulator.

The apparatus of the invention further comprises a matched correcting network coupled to the output of each of the demodulators, specifically a sine matched network $16_1$ and a cosin matched network $17_1$. The term "matched network," as used herein and in the appended claims, refers to a network which, in response to a transmitted test pulse, automatically synthesizes itself into a network having an impulse response which is the time-reversed wave form of the impulse responses of the medium through which the signal is received. Each of the matched networks $16_1$ and $17_1$ may be of the type described and claimed in applicant's prior Pat. 3,206,687. In order automatically to initiate synthesis of these two matched networks, there is provided a common sync pulse separator 18 coupled to the generating means $12_1$ for supplying a sync pulse to each of the networks $16_1$ and $17_1$.

The unit $10_1$ further comprises means for linearly combining the outputs of the demodulators $13_1$ and $14_1$ and their respective matched networks $16_1$ and $17_1$. This means is shown schematically as a conventional linear combining amplifier $19_1$.

The outputs of all of the several units $10_1 \ldots 10_n$ of the drawing are applied to a linear combining amplifier 20, the output of which, in turn, may be coupled to a reciprocal correcting network 21. The term "reciprocal correcting network" is used herein and in the appended claims to refer to a network which, in response to a transmitted test pulse, automatically synthesizes itself to a network whose output has spurious side pulses of minimum amplitude accompanying a desired main pulse. The network 21 may, for example, be of the type described and claimed in applicant's prior Pat. 3,206,688. In order automatically to initiate synthesis of network 21, there is provided a sync pulse separator 22 coupled to the oscillation generating means in one of the units $10_1 \ldots 10_n$, for example to the unit $12_1$ as shown.

The operation of the multipath wave-signal receiving apparatus described above may be best explained by reference to the underlying principles on which the invention is based. The baseband or modulation signal output of the sine demodulator $13_1$ of each of the units $10_1 \ldots 10_n$, upon the transmission of a single test pulse through the ionosphere, is received multipath and is sine-homodyne demodulated. In Z Transform notion, the received sine-baseband impulse response to the ionospheric medium as represented by the output of the sine demodulator $13_1$ is:

$$I_s(z)=\sum_{r=1}^{n}(ar \sin \emptyset_r)z^{-r} \quad (1)$$

where:

$z=\gamma^p$ $p$=La Place Transform complex variable $r$=the units of relative time delay of any particular pulse sample $a_r$ of the distorted and dispersed received sine-baseband signal $a_r$=pulse sample at time $r$ $\phi_r$=relative phase angle between the received carrier and the locally generated carrier.

Correspondingly, the output of the cosine demodulator $14_1$ to the same single transmitted ionosphere test pulse is:

$$I_c(z)=\sum_{r=1}^{n}(a_r \cos \phi_r)z^{-r} \quad (2)$$

Because of the usually nonzero doppler frequency between the carrier of every received multipath signal and the locally generated carrier, $\phi_r$ varies slowly with time at a rate equal to the doppler frequency. The value of $a_r$ also varies relatively more slowly with time as the ionospheric layers change with time their height, ionization density, and geometry. In practice, however, most of the change with time of $I_s$ and $I_c$ takes place because of the faster variations arising from the nonconstant $\phi_r$ rather than from the slower time variations in $a_r$.

Upon transmission of a test pulse which, during transmission through the ionosphere, becomes dispersed and, upon receipt of such pulse and use of sine-demodulation, there is developed a pulse $I_s(z)$. Concurrently, a transmitted sync pulse is received and separated out in unit 18 to initiate synthesis of the matched network $16_1$ to have an impulse response which is simply $I_s(z)$ reversed in time, that is, $I_s(1/z)$. This matched network has the property that, when the transmitter again sends a single test pulse, the ionosphere being assumed to be unchanged for the moment, the output of the sine matched network $16_1$ comprises a desirably large main pulse occurring at zero relative time whose value is:

$$\sum_{r=1}^{n} (a_r \sin \varnothing_r)^2 \quad (3)$$

Likewise, the output of the cosine matched network $17_1$ comprises a desirably large main pulse, also occurring at zero relative time, of value:

$$\sum_{r=1}^{n} (a_r \cos \varnothing_r)^2 \quad (4)$$

As previously described, these two outputs are added in unit $19_1$ and result in an over-all main pulse given by the sum of Equations 3 and 4 or:

$$\sum_{r=1}^{n} [(a_r \sin \phi_r)^2 + (a_r \cos \phi_r)^2] = \sum_{r=1}^{n} a_r^2 \quad (5)$$

The remarkable fact about Equation 5, and one of the features of this invention, is that the combined output of networks $16_1$ and $17_1$ is independent of all the unknown doppler phase shifts $\phi_r$. Moreover, the output main pulse magnitude is always unipolar and positive and equal in magnitude to the energy received from all of the multipaths in the ionosphere. Also, the side pulse outputs from the two matched networks $16_1$ and $17_1$ combine desirably randomly, thus resulting in an increased main pulse/side pulse energy ratio. Finally, the over-all delay between the transmitted pulse and the main pulse outputs from all the $2n$ matched networks is time-invariant and not dependent on the time-variable multipath structure of the ionosphere nor on its time-variable doppler.

In accordance with well-known principles of diversity reception, flat-fading of the signals received over the several channels varies randomly with respect to each other and their aggregate sum, developed by the combining amplifier 20, is relatively constant.

In systems in which signal distortion and dispersion are severe, the signal output of the combining amplifier, while comprising a strong main pulse, may still contain troublesome minor side pulses. By impressing the resultant signal output of the combining amplifier 20 upon the reciprocal correcting network 21, these spurious side pulses may be substantially eliminated, as described in above-mentioned Pat. 3,206,688. The network 21 is automatically synthesized on a test pulse distinct from that used to set up the matched networks $16_1$ and $17_1$. To this end, a sync pulse transmitted concurrently with the test pulse is separated from the received signal by the separator 22 and applied to the reciprocal network 21 to initiate automatic synthesis thereof on the received test pulse, thereby minimizing spurious side pulses in its output.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. In a modulated-carrier wave-signal translating system including a transmitter and a receiver interrelated by a multipath radio link having nonlinear phase characteristics, an apparatus at said receiver for minimizing fading due to multipath effects and for minimizing signal dispersion and distortion due to such phase characteristics comprising:

an input circuit for received multipath signals;

means for generating oscillations having a frequency equal to the average carrier frequency of the received signals;

first and second demodulator means circuits individually coupling said input circuit to said oscillation generating means and to said demodulator means;

circuits individually coupling said oscillation generating means to said demodulator means;

the relative phase characteristics of the two couplings to said demodulators being so proportioned that the two carrier-frequency inputs to one of said demodulators differ in phase by substantially 90° relative to the two carrier-frequency inputs to the other of said demodulators, whereby, upon transmission of a single test pulse through the ionosphere, the output signal of said first demodulator means is represented by the expression $$\sum_{r=1}^{n} (a_r \sin \phi_r) z^{-z}$$

and the output signal of said second demodulator means is represented by the expression $$\sum_{r=1}^{n} (a_r \cos \phi_r) z^{-r}$$

a first matched correcting network coupled to the output of said first demodulator means having an impulse response which is the time reverse of the factor $$\sum_{r=1}^{n} (a_r \sin \phi_r) z^{-r}$$

a second matched correcting network coupled to the output of said second demodulator means having an impulse response which is the time reverse of the factor $$\sum_{r=1}^{n} (a_r \cos \phi_r) z^{-r}$$

and means for linearly combining the outputs of said correcting networks, whereby the output of said combining means is represented by the expression:

$$\sum_{r=1}^{n} [(a_r \sin \phi_r)^2 + (a_r \cos \phi_r)^2] = \sum_{r=1}^{n} a_r^2$$

where:

$z = \epsilon^p$ $p$ = La Place Transform complex variable $r$ = the units of relative time delay of any particular pulse sample $a_r$ of the distorted and dispersed received sine-baseband signal $a_r$ = pulse sample at time $r$ $\phi_1$ = relative phase angle between the received carrier and the locally generated carrier.

2. An apparatus for minimizing fading due to multipath effects in accordance with claim 1 in which said demodulator means are of the homodyne type.

3. An apparatus for minimizing fading due to multipath effects in accordance with claim 1 in which the 90° relative phase shift is effected by introducing a 90° phase shift in the coupling between said generating means and one of said demodulators.

4. An apparatus for minimizing fading and signal dispersion and distortion in accordance with claim 1 which includes a reciprocal correcting network coupled to the output of said combining means.

5. A modulated-carrier wave-signal diversity receiver including a plurality of apparatus in accordance with claim 1, the input circuit of each apparatus being designed to receive a different diversity channel carrying common information.

References Cited

UNITED STATES PATENTS

| | | | |
|---|---|---|---|
| 3,206,687 | 9/1965 | Di Toro | 328—163 |
| 3,206,688 | 9/1965 | Di Toro | 328—165 |
| 3,225,316 | 12/1965 | Saraga | 179—15SSB |
| 3,229,237 | 1/1966 | Saraga | 325—50 |
| 3,382,499 | 5/1968 | Baud | 325—305 |
| 3,391,339 | 7/1968 | Lynch | 328—166 |

ROBERT L. GRIFFIN, Primary Examiner

A. J. MOYER, Assistant Examiner

U.S. Cl. X.R.

325—49, 367, 369, 436, 444, 477